United States Patent [19]
Gorfien et al.

[11] 4,109,020
[45] Aug. 22, 1978

[54] METHOD OF PRODUCING CRISP REHEATED FRENCH FRIED POTATOES

[75] Inventors: Harold Gorfien, Framingham; Abdul R. Rahman, Natick; Donald E. Westcott, Acton, all of Mass.

[73] Assignee: The United States of America as represented by the Secretary of the Army, Washington, D.C.

[21] Appl. No.: 812,080

[22] Filed: Jul. 1, 1977

[51] Int. Cl.² .............................................. A23L 1/216
[52] U.S. Cl. .................................. 426/241; 426/243; 426/637; 426/438
[58] Field of Search ......... 426/637, 438, 237, 241–243

[56] References Cited

U.S. PATENT DOCUMENTS

| 3,881,028 | 4/1975 | Capossela et al. | 426/637 |
| 3,934,046 | 1/1976 | Weaver et al. | 426/637 |

*Primary Examiner*—Joseph M. Golian
*Attorney, Agent, or Firm*—Nathan Edelberg; Robert P. Gibson; Charles C. Rainey

[57] ABSTRACT

An improved method of producing crisp, non-rubbery, reheated french fried potatoes which are frozen for storage purposes after being fried in deep fat and subsequently reheated by means of microwave oven heating without employing additional hot air heating. The improved properties result from a partial dehydration in a hot air oven or a combination of microwave oven heating and hot air oven heating prior to deep fat frying to complete the cooking of the french fried potatoes prior to freezing thereof.

7 Claims, No Drawings

METHOD OF PRODUCING CRISP REHEATED FRENCH FRIED POTATOES

The invention described herein may be manufactured, used, and licensed by or for the Government for governmental purposes without the payment to us of any royalty thereon.

BACKGROUND OF THE INVENTION

This invention relates to a method of producing crisp, non-rubbery, reheated french fried potatoes, more particularly french fried potatoes which have been frozen, after being fried in deep fat, and thereafter thawed and reheated to a temperature suitable for eating.

One of the most persistent problems in the field of prepared foods which require only reheating from the frozen state is in connection with french fried potatoes, which when prepared by conventional procedures, including freezing the fully cooked product, results in a product which upon reheating in a microwave oven is limp and rubbery and which is far removed from the crispness and non-rubbery characteristics of freshly french fried potatoes.

It is an object of the invention to provide a method of producing crisp, non-rubbery, reheated french fried potatoes which will have substantially the same crispness and non-rubbery characteristics as freshly prepared french fried potatoes coming directly from a deep fat fryer.

Other objects and advantages will become apparent from the following description of the invention.

SUMMARY OF THE INVENTION

Crisp, non-rubbery, reheated french fried potatoes are prepared by a method which comprises partially dehydrating par-fried and frozen potato pieces prior to deep fat frying of the potato pieces, followed by freezing of the completely cooked french fried potatoes, which after being frozen may be quickly reheated in a microwave oven without additional hot air heating to produce the improved reheated french fried potatoes at the time of consumption.

DESCRIPTION OF THE PREFERRED EMBODIMENT

We have discovered that the preparation of a fully cooked french fried potato which can be frozen to obtain storage stability and subsequently reheated to a temperature suitable for eating purposes is highly dependent on the manner in which the potato pieces are prepared for the deep fat frying and subsequent freezing. Partial dehydration and surface set appears to be of extremely great importance in determining the ultimate effect of deep fat frying and subsequent freezing on the ability of the fully cooked and frozen french fried potatoes to retain crispness and non-rubberiness after being thawed and reheated in a microwave oven to a suitable temperature for eating purposes.

It is customary to select higher solids content raw potatoes for commercial production of frozen french fried potatoes. However, little attention is paid to the moisture level of the potatoes following par-frying prior to freezing thereof. As a consequence, apparently in such conventional procedures linoleic acid and other ingredients of the deep fat are absorbed in the potato pieces in such a manner as to result in the production of french fried potatoes which, if frozen thereafter, will be limp and rubbery when reheated in a microwave oven. Such french fried potato pieces may be acceptable if eaten directly following the deep fat frying; but the deep fat frying thereof followed by freezing does something to the inner structure of the french fries which produces the limp and rubbery characteristic of the microwave reheated frozen french fried potato pieces of the prior art.

In the method of the invention, commercially par-fried, i.e. partially or incompletely fried in deep fat to a light, creamy color, and frozen potato pieces may be partially dehydrated and surface set by either of two different procedures. According to one partial dehydration procedure, the frozen par-fried potatoes are heated in an air oven at from about 350° to about 400° F. for from about 10 to about 25 minutes. According to the other procedure, the frozen par-fried potatoes are first heated in a combination microwave and hot air oven at from about 390° to about 410° F. for from about 1 to about 3 minutes and then additionally heated in hot air only at from about 390° to about 410° F. for from about 1 to about 3 minutes. Either of these procedures reduces the weight of the potato pieces by from about 10 to about 23 percent. The potato pieces may be cooled, after partial dehydration, to about room temperature, but may be fried to completion in deep fat immediately following the partial dehydration step. One or the other of these partial dehydration procedures is considered to be a prerequisite for frying the potato pieces in a deep fat fryer at about 375° F. for from about 1 to about 3 minutes. Excess fat is then drained from the potato pieces and they are then frozen in a conventional manner at about −10° F. for about 4 hours and stored in the frozen state at about −10° F. Before they are to be eaten, the frozen french fried potatoes are reheated in a "Pyrex" or other suitable dish in a microwave oven without any hot air supplementation, preferably at a frequency of about 2450 megaherz and a power of about 650 watts for about 135 seconds. When removed from the microwave oven, the potato pieces are as crisp and non-rubbery as if they had been freshly prepared from commercially par-fried and frozen potatoes by deep fat frying without any intervening freezing and storage of the fully cooked french fried potatoes in the frozen state.

Various types and sizes of potato particles may be processed according to the invention; e.g., one-fourth inch diameter shoe string cut potatoes, five-sixteenths inch to three-eighths inch diameter straight cut potatoes, or five-sixteenths inch to one-half inch diameter crinkle cut potatoes may be processed in accordance with the above-described procedures with satisfactory final results.

When the method of the invention is followed, the potato pieces lose from about 32 to about 39 percent of their original weight prior to the reheating of the frozen french fried potato pieces in a microwave oven.

The moisture content of the potato pieces generally averages from about 42 to about 43 percent after the partial dehydration and deep fat frying of the potatoes. Following the reheating of the frozen french fried potato pieces in a microwave oven, the moisture content of the potatoes drops to from about 40 to about 41 percent. On the other hand, commercially par-fried and frozen potatoes given a two-minute deep fat fry without partial dehydration, as described above, then frozen and subsequently reheated in a microwave oven, had a substantially higher moisture content of about 52 percent after being reheated in a microwave oven; and the latter potatoes were limp and rubbery. These facts emphasize the importance of the partial dehydration of the potato pieces prior to the deep fat frying for producing french fried potatoes which, following freezing and thereafter reheating in a microwave oven, will be crisp and non-rubbery.

Commercial par-frying procedures are rather thoroughly disclosed in "Potato Processing" by William F. Talburt and Ora Smith, Third Edition, 1975, published by The Avi Plublishing Company, Inc., Westport, Connecticut, at pages 420-423. Although in commercial practice it is customary to freeze the par-fried potato pieces and store them, it is not necessary to do this before partially drying and then finish deep fat frying the potato pieces.

Unless otherwise indicated, percentages disclosed herein are percentages by weight.

The invention may be better understood by reference to the following examples, which are for illustrative purposes, and are not intended to limit the scope of the invention.

EXAMPLE 1

Frozen par-fried potatoes in the form of straight cut pieces 5/16-inch in diameter prepared commercially in a manner such as that described in the above referenced publication on "Potato Processing" by William F. Talburt on Ora Smith, and frozen after the par-frying, the freezing taking place at about −10° F. and the frozen par-fried potatoes being maintained at 0° to −10° F. until the next step in the preparation of fully french fried and frozen potatoes, are spread out in a single layer on a wire screen and heated in an air oven at about 350° F. for about 15 minutes to partially dehydrate and surface set the potato pieces prior to deep fat frying to complete the french frying thereof. The resulting partially dehydrated potato pieces are removed from the air oven and allowed to cool at room temperature of about 72° F. for about 7 minutes.

The partially dehydrated potato pieces are deep fat fried in molten all-purpose shortening, a mixture of vegetable oils substantially free of emulsifiers, at about 375° F. for about 2 minutes. The excess oil is drained off of the french fried potato pieces and the potato pieces are placed on a tray in a shallow layer and frozen at about −10° F. over a 4 hour period. The frozen french fried potatoes are stored at about −10° F. until ready for use. They are then quickly reheated in a microwave oven having a microwave source of a power of about 650 watts at a frequency of about 2450 megaherz while resting on a "Pyrex" dish by exposure to the microwaves for about 135 seconds. The resulting reheated french fried potatoes are crisp and non-rubbery in texture and have a very high overall acceptability.

By comparison, similarly par-fried and frozen potato pieces, such as those described above, when deep fat fried in a manner similar to that employed with the partially dehydrated potato pieces, but without the prior partial dehydration, then frozen in a manner similar to the above-described french fried potatoes and reheated, after substantially the same storage period and conditions, in a microwave oven under similar conditions to those described above as having been employed with the above experimental procedure, resulted in reheated french fried potato pieces which were limp and rubbery in texture, as are to a greater or lesser degree all conventionally produced fully cooked and frozen french fried potatoes following reheating in a microwave oven.

EXAMPLE 2

Frozen par-fried potato pieces similar to those of Example 1 are spread out in a single layer on a "Pyrex" plate and placed in a combination microwave and hot air oven, microwaves at a power of about 600 watts and a frequency of about 2450 megaherz being introduced into the oven while it is maintained at about 400° F. air temperature. The potato pieces are exposed to this combination of microwave radiation and hot air heating for about 2 minutes. Then the microwave radiation is terminated and the potato pieces are allowed to remain in the oven with the air temperature being maintained at about 400° F. for a further period of 2 minutes. At the end of this exposure resulting in partial dehydration of the potato pieces, the potatoes are allowed to cool at room temperature of about 74° F. for about 9 minutes.

The partially dehydrated potato pieces are deep fat fried in molten all-purpose shortening at about 375° F. for about 2 minutes. The excess oil is drained off of the french fried potato pieces and the potato pieces are frozen in a similar manner to that used for the fully french fried potato pieces in Example 1. The frozen french fried potato pieces are stored at about −10° F. until ready for use. They are then reheated in the same manner as the frozen french fried potato pieces in Example 1, employing microwaves in a similar manner. The resulting reheated french fried potatoes are substantially equally crisp and non-rubbery as the reheated french fried potato pieces of Example 1.

The main distinction between the procedure of this example and that of Example 1 is that the partial dehydration is carried out to the degree desired in a shorter length of time when the procedure of this example is employed and with substantially equally as good a final result in terms of physical characteristics and behavior of the reheated french fried potato pieces.

It is to be understood that minor variations in temperatures, times of exposure of the potato pieces both during the partial dehydration step and during the final deep fat frying step may be desirable depending on such factors as the type of potato employed, its moisture content in the beginning (which in turn may depend on numerous environmental factors), the sizes and shapes of the potato pieces, and other variations which are unavoidable, particularly on a commercial scale of production. The important consideration is that by careful selection and adjustment of the partial dehydration conditions applied to commercially par-fried and frozen potato pieces prior to the final deep fat frying which completes the cooking of french fried potatoes, the resulting fully cooked french fried potatoes may be frozen and stored, if desired, for long storage periods in the frozen state, and may on very short notice be converted into a crisp, non-rubbery, highly acceptable, reheated french fried potato product by reheating the frozen product in a microwave oven in less than 3 minutes to give a french fried potato product substantially equal in acceptability to freshly prepared french fried potatoes.

We wish it to be understood that we do not desire to be limited to the exact details described, for obvious modifications will occur to a person skilled in the art.

We claim:

1. A method of producing crisp, non-rubbery, reheated french fried potatoes which comprises the steps of par-frying fresh potato pieces in deep fat to a light cream-colored surface appearance, separating the par-fried potato pieces from said deep fat, heating said par-fried potato pieces until the weight thereof is reduced by from about 10 to about 23 percent by weight, further frying said potato pieces in deep fat at about 375° F. for from about 1 to about 3 minutes, separating said potato pieces from said deep fat, freezing said potato pieces, storing said potato pieces in the frozen state until time for consumption thereof, and heating said potato pieces with microwave energy sufficiently to render them palatable.

2. Method according to claim 1, wherein in said step of heating the par-fried potato pieces until the weight thereof is reduced by from about 10 to about 23 percent said potato pieces are heated in an air oven at a temperature of from about 350° to about 400° F. for from about 10 to about 25 minutes.

3. Method according to claim 1, wherein in said step of heating the par-fried potato pieces until the weight thereof is reduced by from about 10 to about 23 percent said potato pieces are given a combination heating of from about 1 to about 3 minutes with microwave energy and heated air at from about 390° to about 410° F. and thereafter of from about 1 to about 3 minutes with heated air only at from about 390° to about 410° F.

4. Method according to claim 1, wherein said step of heating said potato pieces with microwave energy is carried out at a microwave power of about 650 watts and frequency of about 2450 megaherz for about 135 seconds.

5. Method according to claim 1, wherein said par-fried potato pieces are frozen before the step of heating said par-fried potato pieces until the weight thereof is reduced by from about 10 to about 23 percent by weight.

6. Method according to claim 5, wherein in said step of heating the par-fried potato pieces until the weight thereof is reduced by from about 10 to about 23 percent said potato pieces are heated in an air oven at a temperature of from about 350° to about 400° F. for from about 10 to about 25 minutes.

7. Method according to claim 5, wherein in said step of heating the par-fried potato pieces until the weight thereof is reduced by from about 10 to about 23 percent said potato pieces are given a combination heating of from about 1 to about 3 minutes with microwave energy and heated air at from about 390° to about 410° F. and thereafter of from about 1 to about 3 minutes with heated air only at from about 390° to about 410° F.

* * * * *